July 31, 1928.
R. T. WILLIAMS
VARIABLE CONDENSER
Filed Aug. 11, 1926
1,678,840
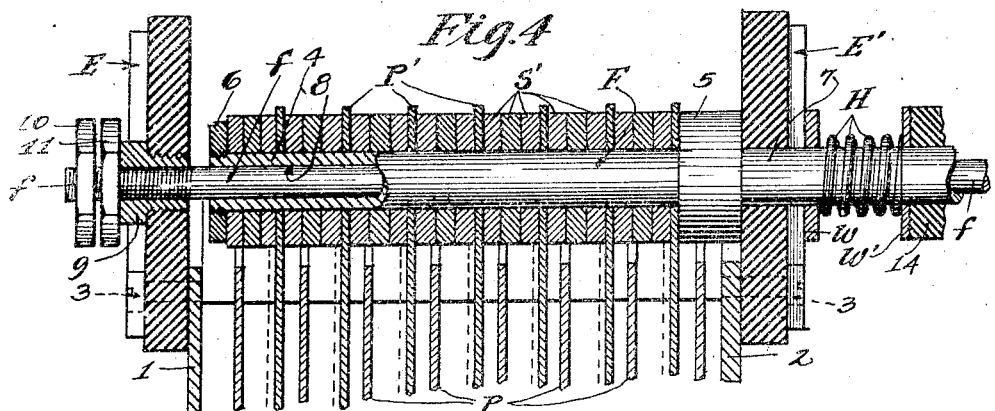
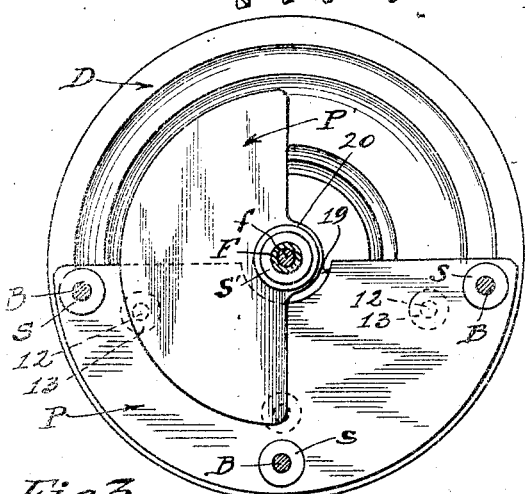
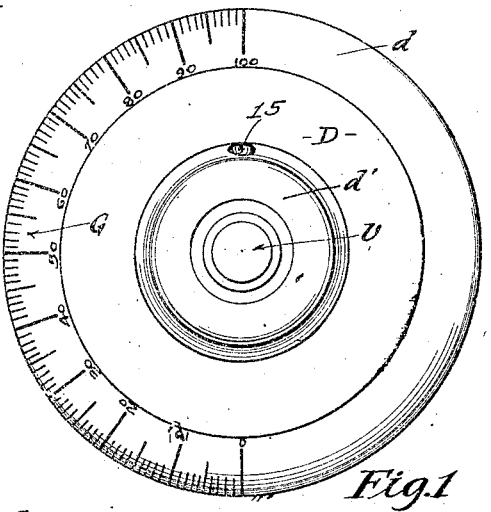
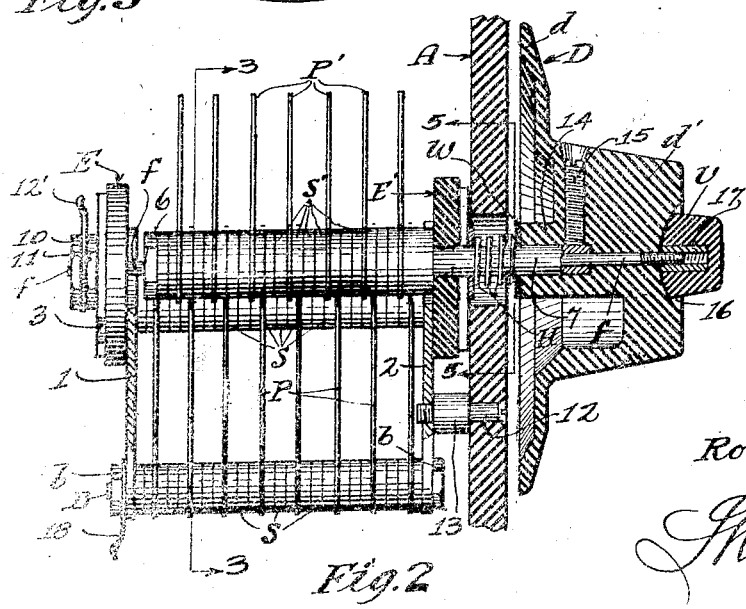
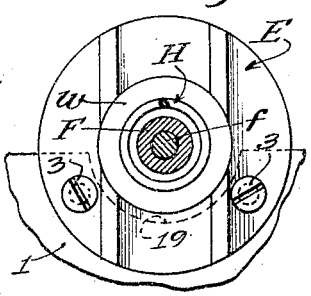
INVENTOR
Robert T. Williams,
BY
*Arthur L. Mack*
ATTORNEY Patented July 31, 1928.

1,678,840

UNITED STATES PATENT OFFICE.

ROBERT T. WILLIAMS, OF LOS ANGELES, CALIFORNIA.

VARIABLE CONDENSER.

Application filed August 11, 1926. Serial No. 128,572.

This invention relates to and has for a main object the provision of an improved type of variable condenser for radio receiving sets, embodying a plurality of stationary or fixed plates, and a plurality of relatively rotatable plates alternating therewith, whereby the capacity of the condenser may be varied according to requirements for tuning in different stations.

An object of this invention is to provide means whereby the rotatable plates may be adjusted longitudinally with respect to the stationary plates, as well as rotatably with respect thereto. In the operation of condensers of this character the stationary plates and the rotatable plates are usually of semi-circular form, and the rotatable plates mesh between and are disposed in close proximity to, but are spaced from the stationary plates so that when the plates are turned the portions of the rotatable plates which extend between the fixed or stationary plates will determine the capacity of the condenser for the purpose of tuning in different stations.

I have found by experiment that if the rotatable plates are adjustable relative to the fixed plates so as to vary the space longitudinally between the fixed and movable plates, it is possible to tune out all but a single station under conditions where two or three broadcasting stations would be heard simultaneously with a single rotatable adjustment of the movable plates. Accordingly, I have provided means, and it is a primary object of this invention to so arrange the movable plates that they may be adjusted longitudinally of their axis as well as rotatably with respect thereto, and I have also provided means externally of the panel on which the elements of the receiving set are mounted and in connection with the tuning dial for effecting a preliminary and maximum adjustment of the movable plates longitudinally for testing purposes, and for effecting a micrometer adjustment of said plates for the purpose of permanently establishing a desired relation between the movable and fixed plates.

All of these improvements are shown in the drawings accompanying my application, forming a part thereof, in which I have shown a preferred embodiment, and in which:

Fig. 1 is a face view of the tuning dial.

Fig. 2 is an elevation of the same, partly in section.

Fig. 3 is a transverse sectional elevation of the same on line 3—3 of Fig. 2.

Fig. 4 is an enlarged fragmentary section of the same, showing details of construction; and Fig. 5 is an enlarged transverse section of the same on line 5—5 of Fig. 2.

In the drawings I have shown the standard type of variable condenser in connection with my improvements, and including a plurality of stationary plates P, P, etc., and movable plates P', P', etc., which are of semi-circular form and are spaced apart correspondingly and uniformly, and arranged so that the movable plates P' will intermesh with the fixed plates P.

The fixed plates P are held in spaced relation with respect to each other, and with respect to end plates 1 and 2 respectively, on which they are mounted, by means of a plurality of spacers S, S, etc., there being preferably three sets of said spacers, as shown in Fig. 3, which are mounted on longitudinal bolts B, B, etc., extending through the end plates 1 and 2 and the intermediate plates P, and having nuts $b$, $b$, threaded onto the end thereof for providing a rigid structure.

The end plates 1 and 2 are provided with insulating discs E and E' which are attached to the plates 1 and 2, respectively, by means of a pair or more of screws 3, 3. Said discs E and E' are longitudinally alined with each other and are concentric with the axis of the plates P, as shown in Fig. 3.

The plates P' in my device are mounted on a hollow shaft F, with a plurality of spacers S', S', therebetween, and said plates and said spacers are confined on the central portion 4 of shaft F between an enlargement 5 and a nut 6 which is threaded onto the end of a portion 4 as shown in Fig. 4.

A bushing 9 is threaded into the member E and the shaft $f$ is threaded into said bushing, as shown in Fig. 4. A bore 8 is provided throughout the length of said shaft for receiving a smaller shaft $f$ which extends entirely through the hollow shaft F, and is threaded into a bearing 9 in the disc E. The shaft $f$ externally of the bearing 9 is threaded to receive a pair of nuts 10 and 11, between which a clip 12 is confined on the shaft $f$ and is adapted to be connected with a wire leading to a source of electric current for connecting the series of plates P' in the circuit of the receiving set. The plates P and P' are thus shown to be operatively connected together, the movable plates being rotatably mounted on the fixed plates, and the unit so far described is adapted to be attached to the rear of a panel A by means of a pair or more of screws 12 connecting said panel with the outer plate 2.

Said screws 12 have spacers 13 between the panel and the plate 2 for properly positioning the condenser with respect to the panel. Externally of the panel I provide the usual form of tuning dial D which has a beveled periphery $d$, with graduations $g$ thereon, and an operating hub $d'$ which is usually knurled for the purpose of readily turning the dial D for tuning purposes. Said dial has a central and internally extended boss 14 which is counter-bored to receive the extension 7 of shaft F, and a set screw 15 is provided in the portion $d'$ of the dial and is adapted to be set against the end of the extension 7 for fixing the dial D to the shaft F. The outer portion of the dial is bored to receive the outer end of the inner shaft $f$, and the end of portion $d'$ is countersunk at 16 to receive a vernier button V which is provided with a metallic internally threaded bushing 17 for detachably connecting the same to the threaded end of the shaft $f$ at a point externally of the dial, as shown in Fig. 2.

Adjacent the outer face of the insulating disc E' and also adjacent the inner face of the boss 14 on dial D, I provide metallic washers W and W' between which a coiled spring H is mounted on the extension 7 of shaft F, and is held in tension. The tendency of said spring is to normally urge the dial outwardly to a maximum extent, but permits the movement of the dial longitudinally of its shaft against the tension of the spring in the direction of the panel A, from which said dial is normally spaced.

As shown in Fig. 2, one of the bolts B which hold the plates P together, is adapted to carry on one of its ends a clip 18 to which a wire may be connected for connecting the stationary plates P in the receiving circuit. It will also be observed that said plates P have semi-circular cuts 19 in the upper and central portions thereof for providing clearance between said plates and the portions 20 of the plates P', which are attached to the shaft F. Thus, it will be observed that all of the plates P' are connected together in the circuit and are in metallic contact with the central shaft $f$ which is adapted for connection with one side of the circuit, while the plates P are similarly connected together and are in metallic contact with one of the bolts B adapted to be connected to the other side of the circuit. Plates P and P', however, are insulated apart for obvious purposes.

Now, with the structure shown it will be noted that the plates P which are uniformly spaced apart, and the plates P' which are correspondingly spaced apart and are adapted to rotate within the spaces between the plates P, are so arranged that any desired relation may be attained between the plates P and P' by rotating the plates P' through the medium of the dial D, which is fixed to the shaft F, the nut 6 on said shaft serving to hold all of the plates P' and the spacers S' in frictional engagement, so that all of the plates P' will be turned simultaneously and to a corresponding extent.

As hereinbefore stated, the rotation of the plates P' with respect to the plates P, regulates the capacity of the condenser for the difference in wave-length of the broadcasting station, and the plates P' are normally positioned in spaced relation from the plates P but nevertheless in near relation thereto, so that the electric current will bridge the space between the plates in the receiving operation.

It is a well known fact that in the use and operation of radio receiving sets it is often very difficult to tune out powerful stations or stations which are nearer to a receiving set than others, and frequently there will be a confusion in the reception and several stations can be heard simultaneously. By experimentation I have found that when the plates P' are adjusted relative to the plates P, so as to increase the gap or space between the plates P' and P longitudinally, I am enabled to tune out all but a single station, or at least to vary the receptivity of the conflicting stations so as to render the reception of a single station clearer and distinct. This is accomplished by the longitudinal adjustment of the plates P' with respect to the plates P.

In operation, the dial D and plates P' are first turned to the proper position for receiving from a certain broadcasting station. Thereafter the dial D and plates P' may be moved longitudinally against the tension of the spring H by moving the dial inwardly in the direction of the panel A, sufficient clearance to provide for this movement being provided between the nut 6 on shaft F and the member E. This initial movement of the dial D longitudinally will provide an index for the extent of movement required for cutting out all but a single station, and thereafter the vernier button V may be turned, effecting a micrometer adjustment of the plates P' with respect to the plates P. This movement is effected by reason of the fact that the central shaft $f$ is non-rotatably held in the member E, while the shaft F is rotatable on the shaft $f$ and is also longitudinally movable thereon. Thus, an initial and approximate relation of the plates P and P' and an ultimate and inner adjustment of the same may be effected for the purpose described.

What I claim is:

1. A variable condenser including a series of stationary plates, a supporting panel therefor, spaced supporting plates, a shaft fixedly mounted on and insulated from said supporting plates, a hollow shaft rotatably and reciprocably mounted on said fixed shaft and extended from said panel, a plurality of movable plates fixed to said hollow shaft and alternating with said stationary plates, a dial externally of said panel attached to the end of said hollow shaft for rotatably adjusting said movable plates with respect to said stationary plates, and means connected with said fixed shaft centrally of said dial for maintaining a desired longitudinal adjustment of said movable plates.

2. A variable condenser including a frame, a plurality of spaced stationary plates mounted thereon, a longitudinally adjustable shaft insulated from and supported by the two end plates and adjustable relative thereto, a hollow shaft encompassing said first mentioned shaft, a plurality of movable plates fixedly held on said hollow shaft and alternating with said stationary plates, a dial fixed to an end of said hollow shaft for rotating the movable plates, and an operating member externally of said dial, adjustably connected with said first mentioned shaft for moving the movable plates longitudinally thereon and with respect to said stationary plates.

3. A variable condenser including a frame having spaced supporting members, a plurality of spaced stationary plates mounted thereon, a longitudinally adjustable shaft extending through said supporting members and adjustable in one of said members, a hollow shaft encompassing said first mentioned shaft, a plurality of movable plates fixedly held on said hollow shaft and alternating with said stationary plates, a dial fixed to an end of said hollow shaft for rotating the movable plates, an operating member externally of said dial, adjustably connected with said first mentioned shaft for moving the movable plates longitudinally thereon and with respect to said stationary plates, and spring means intermediate one of said supporting members and said dial for resiliently holding the movable plates in adjusted positions.

4. A variable condenser including a plurality of stationary plates and a plurality of movable plates coaxially mounted with respect to each other, a frame for operably supporting the same, a rotatable hollow shaft journaled in said frame for supporting said movable plates, a stationary shaft supported on said frame, and relatively adjustable operating members on the ends of said shafts for respectively effecting the rotation of the movable plates and the longitudinal adjustment of the hollow shaft on the stationary shaft for longitudinally adjusting the movable plates.

5. The combination with a panel of a variable condenser including a frame, a set of stationary plates and a set of movable plates spaced therefrom, a pair of telescoping shafts supported on said frame for supporting said movable plates, the outer shaft being adjustable longitudinally on the inner shaft and separate coaxially mounted operating members at the ends of said shafts respectively for rotating and longitudinally adjusting the outer shaft on the inner shaft for the purpose described.

ROBERT T. WILLIAMS.